April 29, 1930.  K. MINAMI  1,756,162
BLADE SHARPENING DEVICE FOR LAWN MOWERS
Filed Aug. 4, 1928
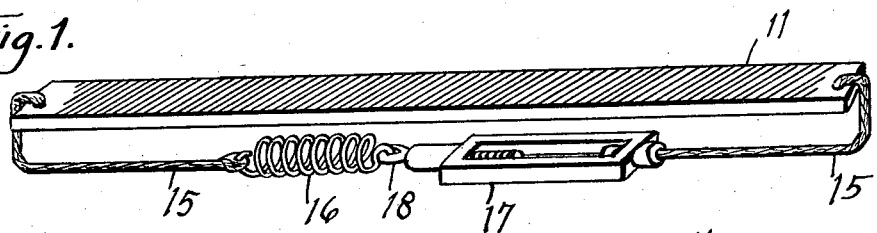
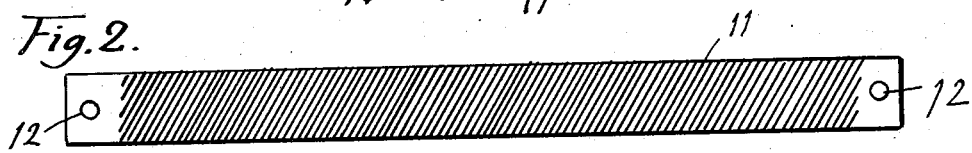
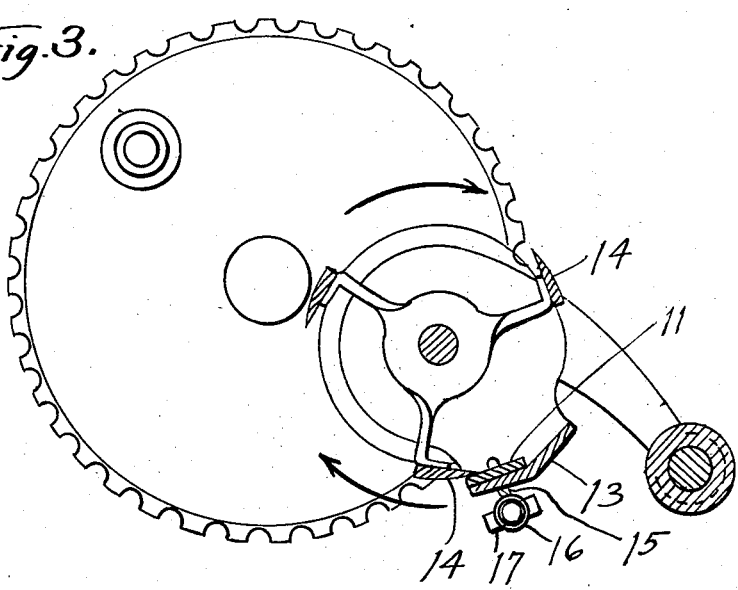
INVENTOR:
KAMEKICHI MINAMI.
BY ATTY:

Patented Apr. 29, 1930

1,756,162

UNITED STATES PATENT OFFICE

KAMEKICHI MINAMI, OF LOS ANGELES, CALIFORNIA

BLADE-SHARPENING DEVICE FOR LAWN MOWERS

Application filed August 4, 1928. Serial No. 297,505.

This invention relates to an improved device for sharpening the blades of lawn mowers, and its objects are to provide means for quickly sharpening the knife-blades, for sharpening them uniformly, for maintaining them in a uniform width from the center to the ends of the blades, and to provide sharpening means quickly attachable to and detachable from the lawn mower.

In use, the blades wear thinner in the middle than on the ends. They cannot be corrected by sharpening the blades with hand files. The result is that the blades do not cut effectively.

To overcome these objections, I provide a file, and means for clamping it effectively in a position to sharpen the blades uniformly throughout their length, and to reduce them to a uniform width and thickness throughout their length, whereby the blades will cut in an effective manner.

The preferred means by which I have accomplished the objects of my invention, are illustrated in the accompanying drawings, and are hereinafter specifically described. That which I believe to be new is set forth in the claim.

In the drawings: Figure 1 is a perspective view of my improved sharpening device. Fig. 2 is a plan view of the file. Fig. 3 is a sectional view showing parts of a lawn mower and my device applied thereto.

Referring to the drawings, the sharpening device consists of a file 11, having both sides designed for cutting, and having holes 12 on each end. The file is adapted to be positioned for use, on the bar 13, of the lawn mower; the bar 13 being adjustable relative to the knife blades 14, as provided on the ordinary lawn mower.

Cords 15 are attached to file 11, and are adapted to extend beneath the bar 13. A coiled spring 16 is secured to one of cords 15, and a turn-buckle 17 is secured to the opposite cord 15; the spring 16 being secured to part 18, of the turn-buckle.

In use, the file 11 is applied in the position shown in Fig. 3, and is maintained rigidly by adjusting the turn-buckle. The knife blades are then rotated by any convenient means, and are rotated in the direction indicated by arrows, which is reversed relative to the rotary cutting direction.

By the use of the device as shown, the blades will be ground to a uniform thickness throughout their length, and will be sharpened in a uniform manner.

What is claimed is:

A sharpening device, comprising a file, cords extending from the ends thereof, and a spring and turnbuckle interposed between the ends of said cords whereby the file may be clamped to a lawn mower frame to contact with the blades.

In testimony whereof, I hereunto affix my signature.

KAMEKICHI. MINAMI.